United States Patent [19]

Mondshine

[11] 4,175,042

[45] Nov. 20, 1979

[54] WELL COMPLETION AND WORK OVER FLUID AND METHOD OF USE

[75] Inventor: Thomas C. Mondshine, Houston, Tex.

[73] Assignee: Texas Brine Corporation, Houston, Tex.

[21] Appl. No.: 850,639

[22] Filed: Nov. 11, 1977

Related U.S. Application Data

[63] Continuation-in-part of Ser. No. 735,169, Oct. 26, 1976, abandoned.

[51] Int. Cl.$^2$ .................................... E21B 43/00
[52] U.S. Cl. .................... 252/8.55 R; 166/305 R; 252/8.5 A
[58] Field of Search ............ 252/8.55 R, 8.5 A, 8.5 B, 252/8.5 LC

[56] References Cited

U.S. PATENT DOCUMENTS

| | | | |
|---|---|---|---|
| 3,246,692 | 4/1966 | Metler et al. ...................... | 252/8.55 |
| 3,319,715 | 5/1967 | Parks ................................ | 252/8.55 X |
| 3,675,717 | 7/1972 | Goins et al. ...................... | 166/278 |
| 3,852,201 | 12/1974 | Jackson ............................ | 252/8.5 |
| 3,953,335 | 4/1976 | Jackson ............................ | 252/8.5 |
| 3,986,964 | 10/1976 | Smithey ............................ | 252/8.5 |
| 3,988,246 | 10/1976 | Hartfiel ............................ | 252/8.5 |
| 4,003,838 | 1/1977 | Jackson et al. .................. | 252/8.5 |
| 4,046,197 | 9/1977 | Gruesbeck et al. ............. | 252/8.5 X |

OTHER PUBLICATIONS

Rogers, Composition and Properties of Oil Well Drilling Fluids, Third Edition, Pub. 1963, pp. 426–428 and 619–622.

*Primary Examiner*—Herbert B. Guynn
*Attorney, Agent, or Firm*—Jack W. Hayden

[57] ABSTRACT

A nondamaging work over and completion fluid having water soluble bridging agents includes a saturated brine solution having at least one water soluble salt which is insoluble in the saturated brine solution and having particle size range of about 5 microns to about 800 microns and wherein greater than about 5% of the particles are coarser than 44 microns. Viscosifier and suspension additive is added to provide the desired viscosity and assist in maintaining the water soluble sized salt suspended in the saturated brine solution. If desired or necessary a fluid loss control agent may be added to enhance the fluid loss control or filtration control of the completion fluid.

The invention may be practiced by pumping or discharging the fluid or a slug or pill of the fluid into an oil, gas, water, injection or storage well where operations are to be conducted in which it is desired to temporarily plug the permeable zone while such operations are carried out. Thereafter, the water soluble bridging agents are removed by connate water from the permeable zone, or a nonsaturated brine wash, or ordinary water circulated in the well.

16 Claims, 2 Drawing Figures

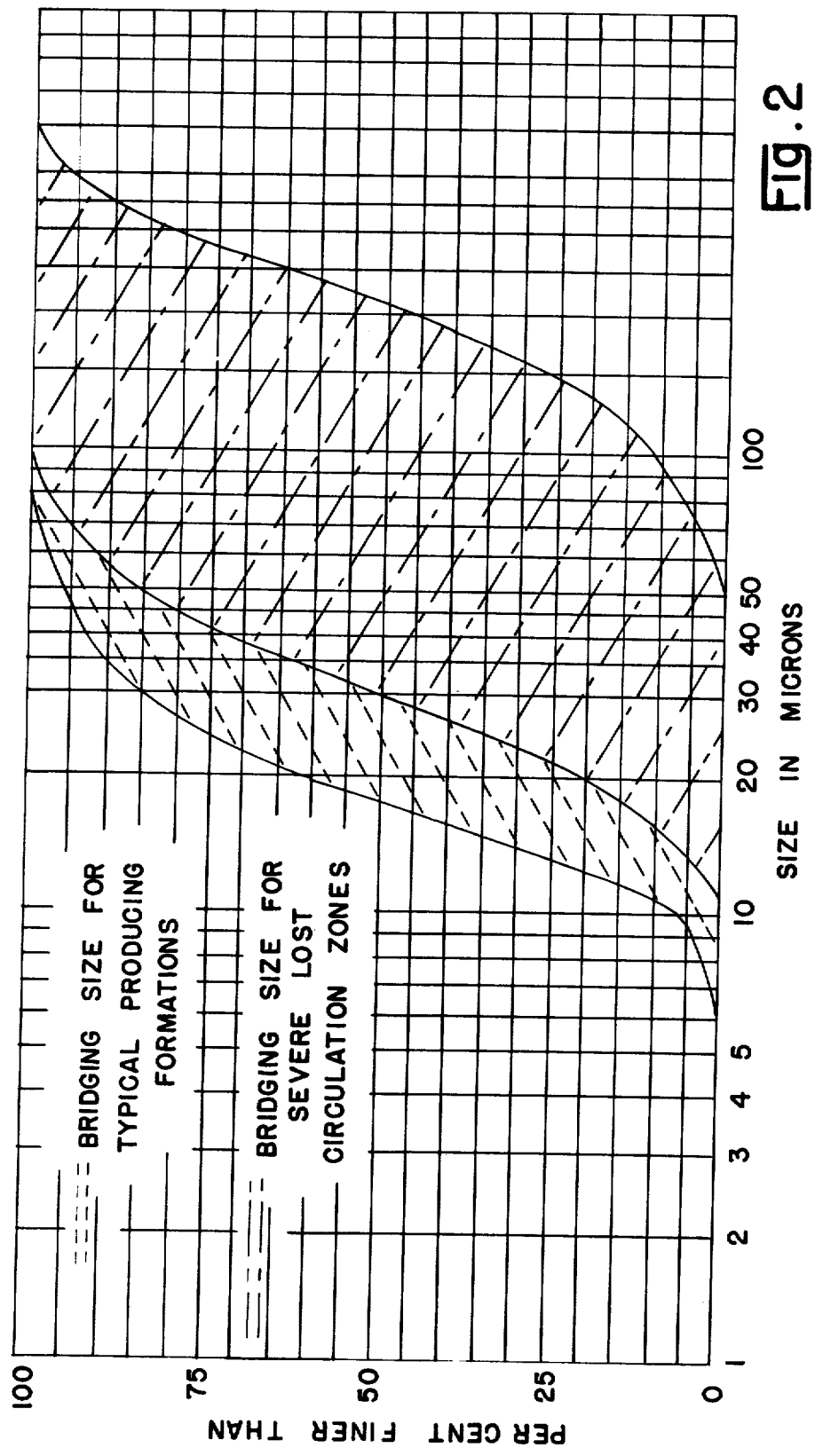

WELL COMPLETION AND WORK OVER FLUID AND METHOD OF USE

CROSS REFERENCE TO RELATED APPLICATION

This application is a continuation-in-part of my prior copending application Ser. No. 735,169 filed on Oct. 26, 1976, now abandoned for "Well Completion and Work Over Fluid and Method of Use".

DESCRIPTION OF THE PRIOR ART

The only prior art with which applicant is familiar is: U.S. Pat. Nos. 3,675,717; 3,844,361; those patents cited in the parent of this application; and a brochure by Gulf Research & Development Center Production Services Division, Houston Technical Services Center entitled "Graded Rock Salt: A Temporary Diverting Agent For Fracturing".

In gravel pack operations such as that described in U.S. Pat. No. 3,675,717 it is desirable, if not essential to use a carrier fluid including a weighting agent which will not plug the formation or gravel bed. Thus, the carrier fluid including the weighting agent in gravel packing has different, critical particle size requirements than fluids used for other applications. For example, in gravel pack operations, less than about 5% by weight of the particles can be coarser than about 44 microns for a successful gravel pack. That is, about 95% by weight of the particles must not exceed about 44 microns in size.

It is essential in gravel packing operations that the concentration and particle size of the carrier fluid not have any effect on the spacing of the gravel particles and be such that it will flow through the voids between the gravel to enable the gravel to be properly placed. If more than about 5% by weight of the particles in the gravel packing carrier fluid exceeds about 44 microns in size, it is generally recognized that the gravel bed will become plugged which renders proper placement of the gravel difficult, if not impossible.

Workover and completion fluids which require bridging agent particles are substantially the opposite in that the particles are of a size to plug and prevent loss of the work over and completion fluids into the formation.

Weighting agents are employed to increase density when the formation pressure is greater than the hydrostatic pressure whereas bridging agents are employed to minimize losses to the formation when the hydrostatic pressure exceeds the formation pressure. Also, bridging agents are employed in substantially lower concentrations than weighting agents.

Thus, well completion fluids with bridging agents above 44 microns in size are not considered as being capable of being employed as gravel pack carrier fluids.

BACKGROUND OF THE INVENTION

Various types of work over and completion fluids with bridging agents are available and in use at the present time. Some are termed oil soluble and others are termed acid soluble, depending upon whether or not the bridging agents in the completion and work over fluids are soluble in oil or in acid. An important function of a completion and work over fluid is to seal off or temporarily plug the face of the producing formation in the well bore so that during the completion and work over operations fluid and solids in the fluid are not lost to the producing formation. Theoretically and ideally it is desired to accomplish this by depositing a thin film of solids over the surface of the producing formation without any loss of solids to the formation. Solids which are coated or deposited on the formation are generally termed bridging agents and temporarily bridge over the formation pores rather than permanently plugging the pores. The coating of bridging agent is then dissolved when the work over or completion operation is completed so that oil or gas may then be produced through the formation and into the well bore. A nondamaging work over and completion fluid is so termed in that it causes a minimum of permanent plugging of the formation pores by loss of solids, or particles in the completion and work over fluid to the producing formation. Other constituents are generally used in a work over and completion fluid including suitable additives or components to provide desired viscosity to the completion fluid and suspension of the solids therein as well as fluid loss control.

SUMMARY OF THE INVENTION

I have discovered that a substantially nondamaging work over and completion fluid with water soluble bridging agents may be formed which consists essentially of a saturated brine solution in which water soluble salt of a particular size range is suspended in the saturated brine solution along with suitable viscosifying and suspension additive and fluid loss control agent. The foregoing composition serves quite well for bridging and temporary plugging of productive formations and clean up can be effected by circulating connate water, water, field brine, or unsaturated brine solutions in the well bore. This eliminates or greatly reduces any problems that may be encountered with use of oil soluble or acid soluble bridging agents which require removal by oil or acid, respectively.

The saturated brine solution may be formed by dissolving a mixture of salts in water. Any water soluble salt may be employed, and any from the group consisting essentially of potassium chloride, sodium chloride, calcium chloride, sodium sulfate, sodium carbonate, sodium bicarbonate, calcium bromide and potassium carbonate, or any mixture of the above salts which will form a saturated brine solution may be employed. Potassium chloride and sodium chloride are preferred due to their availability and cost.

In order to effectively seal the surface of a permeable formation, the size and concentration of bridging particles is extremely important. Pore sizes vary considerably in different well bores so that fluid design requires a particle distribution that covers a wide range of formation permeabilities and types. I have discovered that any water soluble salt which is insoluble in saturated brine solution may be used as the bridging agent. Any water soluble salt or mixtures of water soluble salt which are insoluble in saturated brine solution may be used to provide the bridging agent. Those selected from the group consisting essentially of potassium chloride, sodium chloride, calcium chloride, sodium sulfate, sodium carbonate, sodium bicarbonate, calcium bromide and potassium carbonate may be used. Potassium chloride and sodium chloride are preferred due to their availability and cost. In saturated brine solution and having particle size ranging from about 5 microns to about 800 microns, wherein greater than 5% of the particles are coarser than 44 microns, and in the amount of about 4 pounds per barrel of saturated brine solution to about 50 pounds per barrel of saturated brine solution the foregoing sized salts serve quite well as bridging agents for formations of varying permeabilities and in vugular type formations or fractured formations. The finest salt particles will tend to dissolve as temperature of the saturated brine solution increases and upon cooling will precipitate out of solution. The particle size range and amount of salt added to the saturated brine solution is such that bridging is assured even at temperatures of from 300° F. to 400° F. in the well bore.

A primary object of the invention is to provide a nondamaging work over and completion fluid consisting essentially of a saturated brine solution having sized particles suspended therein to provide water soluble bridging agents in the range of about 5 to about 800 microns of water soluble salt which is insoluble in the saturated brine solution and wherein greater than about 5% of the particles are coarser than 44 microns. Suitable additive for providing viscosity for the fluid, suspension of the sized salt particles and fluid loss control is added.

Another object therefore of the present invention is to provide an essentially nondamaging work over and completion fluid including suitable additive for viscosity and suspension along with saturated brine solution and water soluble salt to provide water soluble bridging agents which is insoluble in the saturated brine solution and having particle size range from about 5 microns to about 800 microns in size, which greater than 5% of the particles are coarser than 44 microns and the sized salt in an amount of approximately 4 pounds per barrel of saturated brine solution to about 50 pounds per barrel of saturated brine solution.

Yet a further object of the present invention is to provide a substantially nondamaging work over and completion fluid including saturated brine solution having water soluble salts which are insoluble therein to provide water soluble bridging agents with the water soluble salts having particle size range from about 5 microns to about 800 microns in size, wherein greater than about 5% of the particles are coarser than 44 microns, and in the range of approximately 4 pounds per barrel of saturated brine solution to about 50 pounds per barrel of saturated brine solution along with an additive for viscosity and suspension in the range of about 0.2 pounds per barrel to about 5 pounds per barrel of saturated brine solution. For additional fluid loss reduction a fluid loss additive in the range of about 0.2 pound per barrel to about 10 pounds per barrel of saturated brine solution may be added.

Other objects and advantages of the present invention will become apparent from a consideration of the drawings and description.

BRIEF DESCRIPTION OF THE DRAWINGS

FIG. 2 is a chart illustrating the range of sized salt particles to provide water soluble bridging agent suspended in the saturated brine solution including the range for use in a typical producing formation and for severe lost circulation zones.

DESCRIPTION OF THE PREFERRED EMBODIMENTS

Figure 1:
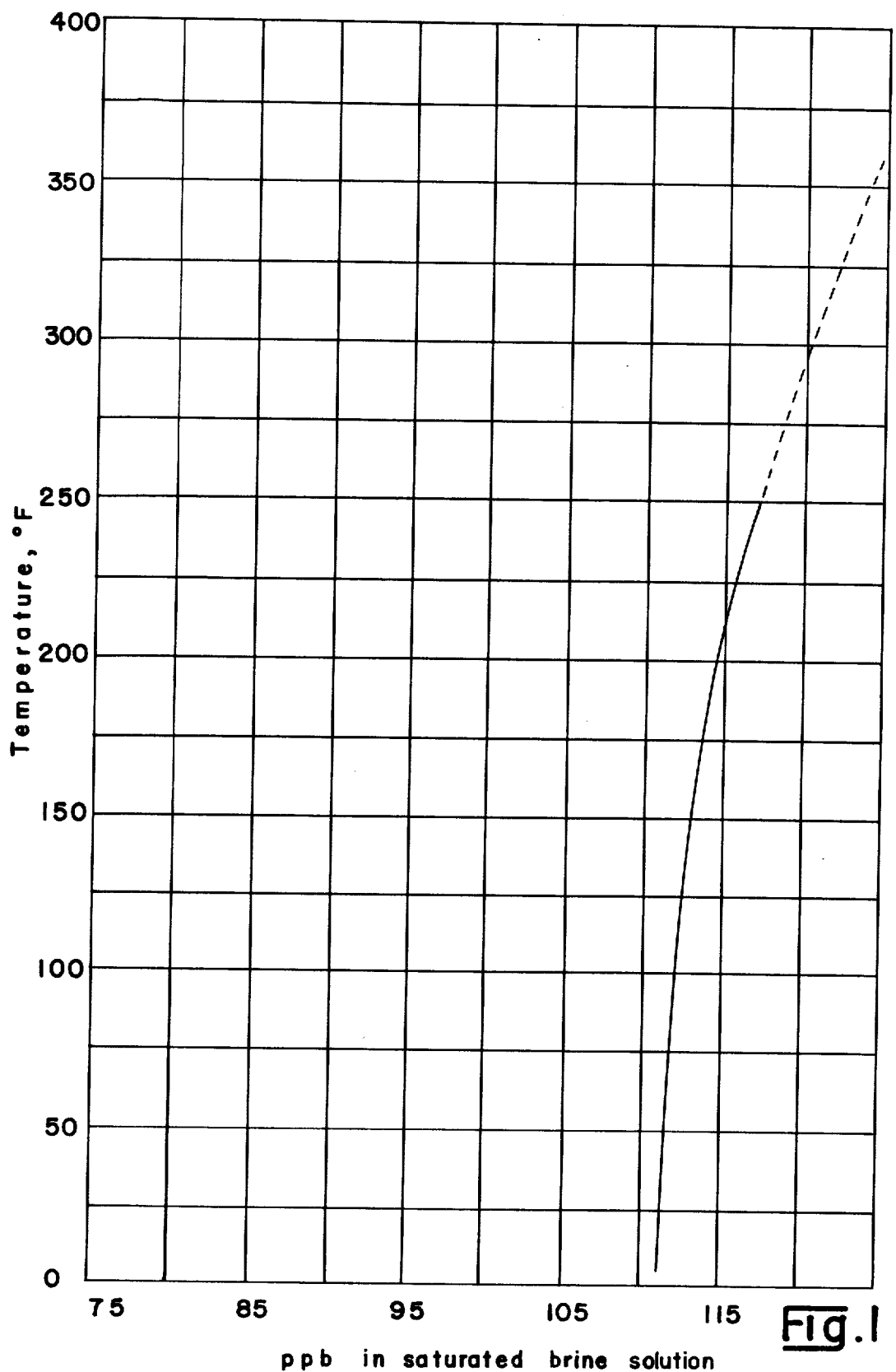
FIG. 1 is a graph illustrating salt solubility in pounds per barrel (ppb) water at various temperatures.

The saturated brine solution of the present invention is formed by dissolving a salt or mixture of salts in water and normally the minimum density of the saturated brine solution is approximately 10 pounds per gallon. In those situations where it is desirable to employ the present invention with a density less than 10 pounds per gallon the saturated brine solution can be diluted with some suitable substance such as diesel oil. In addition, the density of the saturated brine solution can be increased by the addition of iron carbonate or barites to provide a completion and work over fluid with bridging agents having a density of approximately 19 pounds per gallon when desired. Additional quantity of sized salt particles may be added to increase the density as may be desired.

The saturated brine solution can be formed by dissolving any suitable salt or mixture of salts in water to form the saturated brine solution. Some salts that are generally available and which may be used include potassium chloride, sodium chloride, calcium chloride, sodium sulfate, sodium carbonate, sodium bicarbonate, calcium bromide and potassium carbonate. When the invention is employed in well bores which have increased temperatures, the sized salt which is employed as the bridging agent in the completion fluid is added in a sufficient quantity so that even though some of it may dissolve at higher temperatures, the amount dissolved will not materially affect the action of the sized salt particles suspended in the saturated brine solution in functioning as a water soluble bridging agent for temporarily plugging the producing formation pores during the completion and work over procedure.

Any water soluble salt which is insoluble in the saturated brine solution may be employed. Some which are generally available include potassium chloride, sodium chloride, calcium chloride, sodium sulfate, sodium carbonate, sodium bicarbonate, calcium bromide and potassium carbonate. In some instances, it may be desired to use a mixture of these salts. The preferred particle size range of the water soluble salt to be suspended in the saturated brine solution is in a range from about 5 microns to about 800 microns and wherein greater than 5% of the particles are coarser than 44 microns. The quantity of the water soluble salt to be added to the saturated brine solution may vary but is in a sufficient amount to accommodate the temperature conditions in which the present invention is to be employed. Generally the amount of sized salt, or mixture thereof, added to the saturated brine solution is approximately 4 pounds per barrel of saturated brine solution to about 50 pounds per barrel of saturated brine solution depending upon the well bore temperature in which the completion work over fluid is to be employed.

FIG. 1 is a chart illustrating the solubility of sodium chloride salt at various temperatures in pounds per barrel of saturated brine solution at varying temperatures and it will be noted that if the saturated brine solution is prepared at an ambient temperature of, by way of example 75° F., there are about 111 pounds per barrel of salt per barrel of saturated brine solution and if the temperature is increased upwardly towards 300° F., the salt solubility approximates 120 pounds per barrel.

Thus, even though some of the sized particles may be dissolved should the well bore conditions approach substantially increased temperatures as reflected on the salt solubility chart of FIG. 1, the remaining particles suspended in the saturated brine solution will function as water soluble bridging agents for the producing formation.

The saturated brine solution with the sized salt particles therein as described above may be employed with any suitable well known viscosifier to provide the desired viscosity and suspension characteristics to the well completion and work over fluid to retain the sized particles in suspension in the saturated brine solution. In many situations the viscosity additive will function to provide the desired filtrations control so that other fluid loss control additives are not necessary. In other situations it may be desired to provide additional additives to enhance the fluid loss control or filtration control of the completion fluid.

One of the primary advantages of the present invention is that after work over or completion procedures have been completed in the well bore, the sized salt particles forming the bridge on the producing formation may be removed by connate water in the permeable formation which has been temporarily coated. Also, a nonsaturated brine solution or water can be flushed in the well bore to remove the water soluble bridging agents, thus eliminating any problems that are encountered when an oil soluble or an acid soluble bridging agent is employed.

In FIG. 2 the chart illustrates the particle size range of the water soluble salts employed in the saturated brine solution to provide the water soluble bridging particles for use as a bridging agent in a producing formation during work over and completion operations, and it will be noted that the preferred particle size range of such salts is between 5 and 800 microns and wherein greater than 5% of the particles are coarser than 44 microns.

The foregoing particle size range is satisfactory for use in formations of varying permeabilities as well as in vugular formations and fractured formations.

One suitable additive for obtaining desired viscosity and suspension is hydroxyethyl cellulose. Hydroxyethyl cellulose is prepared by treating cellulose with caustic and then reacting the caustic treated cellulose with about 1 to 3 moles of ethylene oxide for each anhydroglucose unit in the cellulose molecule. The viscosity of an aqueous solution of hydroxyethyl cellulose depends upon the concentration and molecular weight of the hydroxyethyl cellulose. Broadly, the hydroxyethyl cellulose employed in the practice of this invention has about 1 to 3 moles of substituent ethylene oxide per anhydroglucose unit and is characterized by a Brookfield viscosity of about 1,500 to 5,000 centipoises at 25° C. for a 1 weight percent solution thereof. A preferred hydroxyethyl cellulose has about 2.5 moles of substituent ethylene oxide per anhydroglucose unit and is characterized by a viscosity of about 1,500 to 2,500 centipoises at 25° C. for a 1 weight percent solution. A suitable hydroxyethyl cellulose is marketed by Union Carbide under the trademark Cellosize QP-100 MH. Hydroxyethyl cellulose is employed to increase the viscosity of the fluid and to increase the stability of the dispersion.

In general, most of the water soluble cellulose ethers can be used as a viscosifier and to provide suspension for the sized salt particles of the invention. Said cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxyethylmethyl cellulose, hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to and they are commonly referred to as CMC, CMHEC, etc. For example, water soluble CMC is available in various degrees of carboxylate substitution ranging from about 0.3 up to the maximum degree of substitution of 3.0. In general, CMC having a degree of substitution in the range of 0.65 to 0.95 is preferred. CMC having a degree of substitution in the range of 0.85 to 0.95 is a more preferred cellulose ether. CMC having a degree of substitution less than the above preferred ranges usually provides too low a viscosity and is thus less desirable. Said degree of substitution of CMC is commonly designated in practice as CMC-7, CMC-9, CMC-12, etc., where the 7, 9, and 12 refer to a degree of substitution of 0.7, 0.9, and 1.2, respectively. CMC having a degree of substituion of 0.7 through 0.9 serves quite well and can be used with the saturated brine and salt particles. For example, in CMHEC it is preferred that the carboxymethyl degree of substitution be at least 0.4. The degree of hydroxyethyl substitution is less important and can range widely, e.g. from about 0.1 or lower to about 4 or higher.

Xanthan gum, which is used as a suspending agent, is also available commerically. It is a hydrophilic colloid produced by bacterium of the species Xanthomonas campestris. The colloid is a polymer containing mannose, glucose, glucuronic acid salts such as potassium glucuronate, sodium glucuronate, or the like, and acetyl radicals. Other Xanthomonas bacteria have been found which produce the hydrophilic gum and any of the xanthan gums and their derivatives can be used in this invention.

Xanthan gum is a high molecular weight linear polysaccharide that is readily soluble in water to form a viscous fluid. Examplary of the xanthan gums that can be employed is an industrial grade of xanthan gum marketed by the Kelco Company under the trademark Kelzan XC xanthan gum. Xanthan gum increases the gel strength of the fluid without appreciably increasing its viscosity.

Guar gums and their derivaties can also be used. Guar gum is a nonionic naturally occurring, high molecular weight polysaccharide. For example, hydroxypropyl guar gum and carboxymethyl hydroxypropyl guar, and quaternary ammonium guar gum may be used.

Other suitable viscosifiers and suspension agents can be employed other than those specifically mentioned above, and I have found that any one of such viscosifiers and suspension agents, or any combination of mixture of suitable viscosifier and suspension agents may be employed, including those mentioned above in any amount as may be desired and preferably in the range of about 0.2 pounds per barrel to about 5 pounds per barrel of saturated brine solution.

Fluid loss control additives which are well known in the art may be employed including by way of example only, calcium lignosulfonate, chrome or ferro chrome lignosulfonate, starches such as corn, potato and tapioca and their derivatives and carboxymethyl cellulose having a degree of substitution in the range of 0.4 through 0.9. The fluid loss control constituents may be added in any amount desired and preferably in the range of about 0.2 pound per barrel to about 10 pounds per barrel of saturated brine solution alone or in any combination.

Where any of the lignosulfonates are used either alone or with any of the other fluid loss control agents the amount may be in the range of about 0.2 pound per barrel to about 20 pounds per barrel of saturated brine solution. Also, it is well known in the art that when any of the lignosulfonates are employed it is desirable to neutralize the acidic nature of the lignosulfonates. This may be done by adding a material to raise the pH of the completion fluid to at least 7. Any one or more of the alkaline earths, such as magnesium oxide or calcium oxide may be employed. Sodium hydroxide may also be used. The amount of material used to adjust the pH of the completion fluid is in the range of about 0.15 pounds to about 5 pounds per barrel of saturated brine.

COMPOSITION AND PROPERTIES OF VARIOUS WORK OVER AND COMPLETION FLUIDS USING SPECIALLY SIZED SALT BRIDGING MATERIAL

| EXAMPLE | 1 | 2 | 3 | 4 | 5 |
|---|---|---|---|---|---|
| Composition in pounds per bbl saturated brine | | | | | |
| Hydroxyethyl Cellulose (Cellosize QP 100 MH) | 2 | 2 | | | |
| Salt (ranging from 5-100 microns, averaging 15-30 microns with about 5% coarser than 44 microns) | 19 | 19 | 19 | 19 | 19 |
| Guar Gum | | | | | 2 |
| Calcium Lignosulfonate | | | | 6 | |
| Xanthan Gum | | | 1 | 1 | |
| Pre-Gelatanized Starch | | | | | |
| Carboxymethyl Cellulose (CMC-9) | | | | | |
| Carboxymethyl Cellulose (CMC-7) | | 4 | | | |
| PROPERTIES | | | | | |
| Density in pound per gal. | 10.2 | 10.2 | 10.2 | 10.2 | 10.2 |
| Plastic Viscosity, (centipoises) | 33 | 80 | 12 | 27 | 14 |
| Yield Point, (lb per 100 sq. ft.) | 58 | 70 | 11 | 31 | 23 |
| API Filtrate, (ml) | 29.2 | 12.0 | 14.0 | 9.4 | 20.0 |
| Seal on 1000 millidarcy Sand Bed at 100 psi | Partial | Good | Good | Good | Partial |

| EXAMPLE | 6 | 7 | 8 | 9[a] | 10[b] |
|---|---|---|---|---|---|
| Composition in pounds per bbl saturated brine | | | | | |
| Hydroxyethyl Cellulose (Cellosize QP 100 MH) | — | — | | | |
| Salt (ranging from 5-100 microns, averaging 15-30 microns with about 5% coarser than 44 microns) | 19 | 19 | 31 | 21 | 27 |
| Guar Gum | 2 | | — | — | — |
| Calcium Lignosulfonate | | | 7 | 5 | 6 |
| Xanthan Gum | | | 1.5 | 1 | 1.5 |
| Pre-Gelatanized Starch | 6 | | — | — | — |
| Carboxymethyl Cellulose (CMC-9) | | 2 | — | — | — |
| Carboxymethyl Cellulose (CMC-7) | | | — | — | — |
| PROPERTIES | | | | | |
| Density in pound per gal. | 10.2 | 10.2 | 10.2 | 12.0 | 11.4 |
| Plastic Viscosity, (centipoises) | 25 | 22 | 12 | 24 | 20 |
| Yield Point, (lb per 100 sq. ft.) | 32 | 18 | 16 | 21 | 14 |
| API Filtrate, (ml) | 8.0 | 9.0 | 5.8 | 6.5 | 3.9 |
| Seal on 1000 millidarcy Sand Bed at 100 p.s.i. | Partial | Good | Good | Good | Good |

[a] 170 lb/bbl of (particle size averaging 30 microns with lessthan about 5% finer than 44 microns) salt added to attain12.0 lb/gallon density.
[b] mixed in 11.0 lb/gallon CaCl$_2$solution.

Any other suitable fluid loss control agent may be employed with the present invention in the concentration range mentioned above.

What is claimed is:

1. A well completion and work over fluid consisting essentially of:
   a. a saturated brine solution consisting of any of the group of potassium chloride, sodium chloride, calcium chloride, sodium sulfate, sodium carbonate, sodium bicarbonate, calcium bromide and potassium carbonate;
   b. a bridging agent consisting of at least one water soluble sized salt which is insoluble in the saturated brine solution, said sized water soluble salt having a particle size in the range of approximately 5 microns to approximately 800 microns and wherein greater than about 5% of the particles are coarser than 44 microns;
   c. the sized soluble salt that is insoluble in the saturated brine solution consisting of any of the group of potassium chloride, sodium chloride, calicum chloride, sodium sulfate, sodium carbonate, sodium bicarbonate, calcium bromide and potassium carbonate in the amount of approximately 4 pounds per barrel to about 50 pounds per barrel of saturated brine solution; and
   d. a viscosifier and suspension additive in the amount of about 0.2 pound per barrel of saturated brine solution to about 5 pounds per barrel of saturated brine solution.

2. The fluid of claim 1 including a fluid loss additive.

3. The fluid of claim 1 wherein the viscosifier and suspension additive is carboxymethyl cellulose having about 1 to 3 moles of substitutent ethylene oxide per anhydroglucose unit and is characterized by a Brookfield viscosity of about 1,500 to 5,000 centipoises at 25° C. for a 1 weight percent solution.

4. The fluid of claim 1 wherein the viscosifier and suspension additive is carboxymethyl cellulose having a degree of substitution in the range of 0.7 through 0.9 and in the amount of about 0.2 pound per barrel of saturated brine solution to about 5 pounds per barrel of saturated brine solution.

5. The fluid of claim 1 wherein the viscosifier and suspension additive is carboxymethyl hydroxyethyl cellulose having a carboxymethyl degree of substitution of at least 0.4 and a hydroxyethyl substitution from about 0.1 or lower to about 4 or higher and in the amount of about 0.2 pound per barrel of saturated brine solution to about 5 pounds per barrel of saturated brine solution.

6. The fluid of claim 1 wherein the viscosifier and suspension additive is xanthan gum or a derivative thereof in the amount of about 0.2 pound per barrel of saturated brine solution to about 5 pounds per barrel of saturated brine solution.

7. The fluid of claim 1 wherein the viscosifier and suspension additive is guar gum or a derivative thereof in the amount of about 0.2 pound per barrel of saturated brine solution to about 5 pounds per barrel of saturated brine solution.

8. The fluid of claim 1 wherein the viscosifier and suspension additive is hydroxypropyl guar gum and in the amount of 0.2 pound per barrel of saturated brine solution to about 5 pound per barrel of saturated brine solution.

9. The fluid of claim 1 wherein the viscosifier and suspension additive is carboxymethyl hydroxypropyl guar gum and in the amount of 0.2 pound per barrel of saturated brine solution to about 5 pounds per barrel of saturated brine solution.

10. The fluid of claim 1 wherein the viscosifier and suspension additive comprises a mixture of any of the group consisting of hydroxyethyl cellulose, having about 1 to 3 moles of substitutent ethylene oxide per anhydroglucose unit and is characterized by a Brookfield viscosity of about 1,500 to 5,000 centipoises at 25° C. for a 1 weight percent solution, carboxymethyl cellulose having a degree of substitution in the range of 0.7 through 0.9, carboxymethyl hydroxyethyl cellulose having a carboxymethyl degree of substitution of at least 0.4 and a hydroxyethyl substitution from about 0.1 or lower to about 4 or higher, xanthan gums and their derivatives, guar gums and their derivatives, said mixture being in the range of about 0.2 pounds per barrel of saturated brine solution to about 5 pounds per barrel of saturated brine solution.

11. The fluid of claim 2 wherein the fluid loss additive consists of calcium lignosulfonate in the range of about 0.2 pound per barrel to about 30 pounds per barrel of saturated brine solution.

12. The fluid of claim 2 wherein the fluid loss additive consists of chrome lignosulfonate in the range of about 0.2 pound per barrel to about 30 pounds per barrel of saturated brine solution.

13. The fluid of claim 2 wherein the fluid loss additive consists of ferro chrome lignosulfonate in the range of about 0.2 pound per barrel to about 20 pounds per barrel of saturated brine solution.

14. The fluid of claim 2 wherein the fluid loss additive consists of any of the group of starches consisting of potato, corn and tapioca and their derivatives in the range of about 0.2 pound per barrel to about 10 pounds per barrel of saturated brine solution.

15. The fluid of claim 2 wherein the fluid loss additive consists of carboxymethyl cellulose in the range of about 0.2 pound per barrel to about 10 pounds per barrel of saturated brine solution having a degree of substitution in the range of 0.4 through 0.9.

16. The fluid of claim 2 wherein the fluid loss additive comprises a mixture any of the group consisting of calcium lignosulfonate, chrome lignosulfonate, ferro chrome lignosulfonate, and any of the group of starches consisting of potato, corn and tapioca and their derivatives and carboxymethyl cellulose having a degree of substitution in the range of 0.4 through 0.9, said mixture being in the range of about 0.2 pound per barrel to about 30 pounds per barrel of saturated brine solution.

* * * * *